No. 619,085. Patented Feb. 7, 1899.
W. V. McGURN.
EYEGLASSES.
(Application filed Dec. 31, 1897.)
(No Model.)

WITNESSES:
J. J. Laass.
H. B. Smith.

INVENTOR
William V. McGurn
By E. Laass
ATTORNEY

THE NORRIS PETERS CO., PHOTO-LITHO., WASHINGTON, D. C.

UNITED STATES PATENT OFFICE.

WILLIAM V. McGURN, OF SYRACUSE, NEW YORK.

EYEGLASSES.

SPECIFICATION forming part of Letters Patent No. 619,085, dated February 7, 1899.

Application filed December 31, 1897. Serial No. 665,036. (No model.)

*To all whom it may concern:*

Be it known that I, WILLIAM V. McGURN, of Syracuse, in the county of Onondaga, in the State of New York, have invented new and useful Improvements in Eyeglasses, of which the following, taken in connection with the accompanying drawings, is a full, clear, and exact description.

This invention consists in improved constructions and combinations of the component parts of eyeglasses which permit the lenses to be readily removed and replaced when required and securely sustain the lenses in their requisite position in relation to the bow-spring, and are provided with novel nose-guards which effectually confine the eyeglasses in proper position on the bridge of the nose without causing undue impressions and uncomfortable bearings on the nose, all as hereinafter more fully described, and set forth in the claims.

Figure 1:
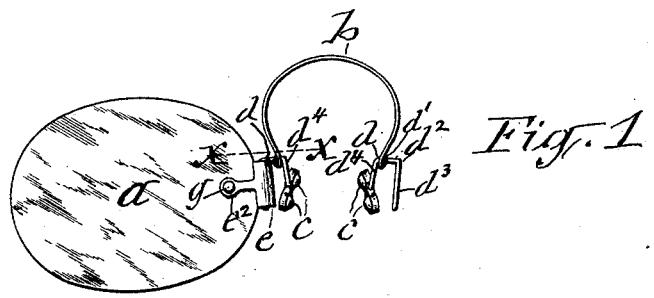
Figure 2:
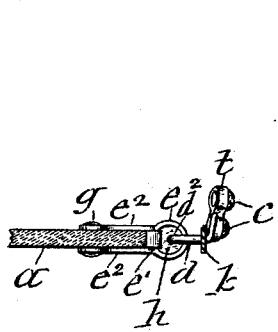
Figures 3, 4:
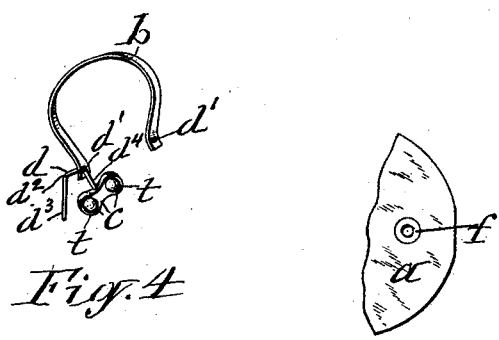
Figure 5:
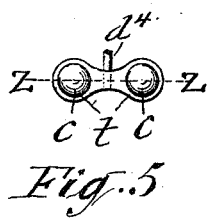
Figure 6:
Figure 7:
Figure 8:
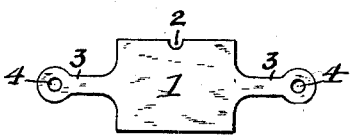

In the accompanying drawings, Figure 1 is a front view of a pair of eyeglasses embodying my invention, one of the lenses being removed to better illustrate the means for supporting the lens on the bow-spring. Fig. 2 is an enlarged transverse section on line X X in Fig. 1. Fig. 3 is an enlarged detached face view of the attaching portion of one of the lenses. Fig. 4 is a perspective view of the bow-spring with one of the lens-supporting wires connected thereto. Fig. 5 is an enlarged face view of the nose-guard. Fig. 6 is a transverse section on line Z Z in Fig. 5.
Fig. 7 is an enlarged detached perspective view of the sleeve by which the lens is supported on the bow-spring, and Fig. 8 is a plan view of the blank from which the aforesaid sleeve is formed.
In said drawings, $a$ represents one of the lenses, $b$ the bow-spring, and $c$ the nose-guard. Said essential parts of the eyeglasses I construct and unite by the following improved devices.
To each end of the bow-spring $b$ I attach a wire $d$, preferably by providing the end of the said spring with a perforation $d'$, through which the wire is passed part way its length and rigidly secured therein by means of solder.
One end portion of said wire is bent at an angle, as shown at $d^2$, to form with the free end thereof a downwardly-extending stem $d^3$ for the attachment of the lens, and the opposite end of the wire is bent to form a shank $d^4$ for the attachment of the nose-guard, as hereinafter described.

The attachment of the lens is effected by means of a metallic sleeve $e$, receiving in it the said stem and formed with a longitudinal slot $e'$ and with ears $e^2$, extending side by side from the longitudinal edges of the sleeve and perforated at their free ends.

The sleeve $e$, with its ears $e^2$, I form of a blank stamped out of sheet metal and composed of the rectangular central portion 1, provided with the notch 2 in one end and arms 3 3, extending laterally from the longitudinal edges of said central portion and perforated in their free ends, as shown at 4 4 in Fig. 8 of the drawings, which blank is bent at the central portion 1 to form thereat the sleeve $e$ and carry the arms 3 3 side by side to serve the functions of the ears $e^2$.

The lens is provided with a perforation near its edge, and in said perforation is inserted a bushing $f$, of wood or other suitable material. This perforated portion of the lens is inserted between the ears $e^2$ and into the longitudinal slot $e'$, and is retained therein by means of a pin or screw $g$, passing through the perforations of the ears and through the bushing $f$, which latter serves to prevent the pin or screw from working accidentally out of its said attachment.

The insertion of the edge of the lens into the slot $e'$ of the sleeve retains the lens in its required plane in relation to the bow-spring.

To retain the stem $D^3$ securely in the sleeve $e$, I place in said sleeve a suitable bushing $h$, which is clamped therein when the sleeve is compressed circumferentially to fasten the ears $e^2$ to the lens. The bushing being at the same time correspondingly compressed causes the stem $d^3$ to be firmly held in the said bushing, and to retain the lens in its requisite position in relation to the companion lens I provide the end of the sleeve $e$ with a notch $i$, through which passes the lateral portion of the wire $d$, adjacent to the stem $d^3$.

In order to more securely retain the eyeglasses in their desired position on the bridge of the nose without causing inconvenience to the wearer of the glasses, I employ a plurality, preferably a pair, of nose-guards $c$ $c$ on each lens. Each of these nose-guards I prefer to form of a plug $l'$, of cork or other suitable material, covered with chamois-skin $l^2$ and secured in one of a pair of eyelets $t$, which are formed in the ends of a bar, as more clearly shown in Fig. 5 of the drawings. Said bar is provided with a transverse groove $t'$ and is attached thereat to the shank $d^4$ of the wire $d$, hereinbefore described. Said shank is inserted into the groove $t'$ and fastened therein preferably by solder.

What I claim as my invention is—

1. The combination, with the bow-spring and lens, of a sleeve disposed axially parallel with the plane of the lens and provided with a longitudinal slot receiving the edge of the lens and with perforated ears extending on opposite sides of the lens, a pin or screw passing through said ears and lens, and a stem attached to the bow-spring and sustained in the aforesaid sleeve as set forth.

2. The combination, with the bow-spring and lens, of a sleeve secured to said lens axially parallel with the plane thereof and provided with a notch in the edge of its upper end, a bushing secured in said sleeve and a stem attached to the end of the bow-spring and inserted in said bushing and formed with an offset passing through the aforesaid notch, as set forth.

3. The combination with the bow-spring, of a stem secured to said spring, a sleeve embracing said stem and formed with a longitudinal slot and with perforated ears extending from the edges of the slotted portion, the lens inserted between said ears and into the slot of the sleeve and provided with a perforation, a bushing in said perforation, and a pin or screw passing through said ears and bushing in the lens as set forth.

4. The combination with the bow-spring and lens, of a wire fastened to said spring and having its free end portion bent at an angle to the fixed end portion, a sleeve secured to the lens and embracing the free end portion of said wire, and a bushing interposed between said sleeve and embraced portion of the wire as set forth.

5. The combination with the bow-spring, of a wire fastened to said spring and having its free end portion bent at an angle to the fixed end portion, a sleeve embracing the free end portion of said wire and provided with a longitudinal slot and with a notch in its end receiving through it the fixed end portion of the wire, a bushing interposed between the sleeve and embraced portion of the wire, perforated ears extending from said sleeve, the lens provided with a perforation and with a bushing in said perforation and inserted between the ears and into the slot of the sleeve, and a pin or screw passing through the ears and bushing in the lens as set forth.

6. The combination with the bow-spring, a stem secured to said spring, and bent at right angles, and the lens provided with a perforation, of a lens-fastener formed of a blank of sheet metal which blank is composed of a rectangular central portion provided with a notch in one end and arms extending laterally from the longitudinal edges of the central portion and perforated in their free end portions, the central portion of said blank being bent to form a sleeve and to carry the aforesaid arms parallel side by side to receive the lens between them, a pin or screw passing through the perforations of said arms and lens and a bushing inserted in the sleeve and embracing the aforesaid stem as set forth.

7. The combination, with the bow-spring, of two wires, each fastened intermediate its ends to one of the ends of said spring, a nose-guard attached to one end of the wire and a lens secured to the opposite end of said wire as set forth.

8. The combination with the bow-spring, of two wires, each fastened intermediate its ends to one of the ends of said spring, a lens secured to one end of the wire, a bar attached to the opposite end of said wire and provided with eyelets in its ends and nose-guards secured in said eyelets as set forth.

9. The combination of the bow-spring having perforations in its ends, wires passing through said perforations and fastened therein, a lens secured to one end of each wire, a bar fastened to the opposite end of said wire and provided with eyelets in its ends and nose-guards secured in said eyelets as set forth.

10. The combination, with the bow-spring and lens, of bars secured to opposite ends of said spring and provided with eyelets and nose-guards formed of cork plugs covered with chamois-skin and secured in said eyelets as set forth.

In testimony whereof I have hereunto signed my name this 28th day of December, 1897.

WILLIAM V. McGURN. [L. S.]

Witnesses:
J. J. LAASS,
H. B. SMITH.